US008902855B2

(12) United States Patent
Etemad et al.

(10) Patent No.: US 8,902,855 B2
(45) Date of Patent: Dec. 2, 2014

(54) OPPORTUNISTIC DEVICE-TO-DEVICE COMMUNICATION (75) Inventors: Kamran Etemad, Potomac, MD (US);
Vivek Gupta, San Jose, CA (US);
Kerstin Johnsson, Palo Alto, CA (US);
Shilpa Talwar, Los Altos, CA (US);
Rongzhen Yang, Shanghai (CN);
Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 13/563,593

(22) Filed: Jul. 31, 2012

(65) Prior Publication Data
US 2013/0034082 A1 Feb. 7, 2013

Related U.S. Application Data (60) Provisional application No. 61/514,010, filed on Aug. 1, 2011, provisional application No. 61/589,774, filed on Jan. 23, 2012.

(51) Int. Cl.
*H04W 4/00* (2009.01)
*H04W 36/14* (2009.01)
*H04W 76/04* (2009.01)

(52) U.S. Cl.
CPC ............ *H04W 36/14* (2013.01); *H04W 76/043* (2013.01)
USPC .......................................... 370/331; 455/440

(58) Field of Classification Search
CPC .............................. H04W 36/00; H04W 76/00
USPC .......................................... 370/331; 455/440
See application file for complete search history.

(56) References Cited

U.S. PATENT DOCUMENTS

| 2004/0077374 | A1* | 4/2004 | Terry ........................ 455/552.1 |
| 2005/0036469 | A1* | 2/2005 | Wentink ........................ 370/338 |
| 2007/0076608 | A1 | 4/2007 | Samuel et al. |
| 2008/0273500 | A1* | 11/2008 | Suh et al. ........................ 370/331 |
| 2009/0141684 | A1* | 6/2009 | Hashimoto et al. ........... 370/331 |
| 2009/0286542 | A1 | 11/2009 | Roberts et al. |

(Continued)

OTHER PUBLICATIONS

Notification of Transmittal of the International Search Report and the Written Opinion mailed Feb. 27, 2013 from International Application No. PCT/US2012/049067.

(Continued)

*Primary Examiner* — Andrew Lai
*Assistant Examiner* — Sumitra Ganguly
(74) *Attorney, Agent, or Firm* — Schwabe, Williamson & Wyatt, P.C.

(57) ABSTRACT

Embodiments of computer-implemented methods, systems, computing devices, and computer-readable media are described herein for opportunistically transitioning service flows of mobile devices between being direct and indirect. In various embodiments, a proximity between first and second mobile devices that are in wireless communication with each other may be monitored. In various embodiments, a selective transition of a service flow between the first and second mobile devices from being indirect through the radio network access node using a first radio access technology ("RAT") to being direct using a second RAT may be facilitated, e.g., responsive to a determination that a first criterion has been met. In various embodiments, a selective transition of the service flow from being direct using the second RAT to being indirect using the first RAT may be facilitated, e.g., responsive to a determination that a second criterion has been met.

23 Claims, 5 Drawing Sheets

(56) References Cited

U.S. PATENT DOCUMENTS

| | | | |
|---|---|---|---|
| 2010/0165882 A1* | 7/2010 | Palanki et al. | 370/254 |
| 2011/0038318 A1* | 2/2011 | Parsons et al. | 370/328 |
| 2011/0222424 A1* | 9/2011 | Abhishek et al. | 370/252 |
| 2011/0244800 A1* | 10/2011 | Bogestam et al. | 455/41.2 |
| 2012/0172045 A1* | 7/2012 | Fukuta | 455/440 |

OTHER PUBLICATIONS

Hakola et al., "Device-to-Device (D2D) Communication in Cellular Network—Performance Analysis of Optimum and Practical Communication Mode Selection," IEEE Communications Society, Wireless Communications and Networking Conference (WCNC) 2010 IEEE, Apr. 18-21, 2010, 6 pages.

Qualcomm News and Events—Press Releases, "Qualcomm to Demonstrate New Peer-to-Peer Technology at Mobile World Congress," Mobile World Congress 2011, printed Jun. 28, 2012, 2 pages.

3GPP, "Medium Access Control (MAC) protocol specification," 3rd Generation Partnership Project; Technical Specification Group Radio Access Network; Evolved Universal Terrestrial Radio Access (E-UTRA) (Release 10), 3GPP TS 36.321 V10.0.0, Dec. 2012, LTE Advanced, 53 pages.

3GPP, "Packet Data Convergence Protocol (PDCP) specification," 3rd Generation Partnership Project; Technical Specification Group Radio Access Network; Evolved Universal Terrestrial Radio Access (E-UTRA) (Release 10), 3GPP TS 36.323 V10.0.0, Dec. 2012, LTE Advanced, 24 pages.

3GPP, "Radio Link Control (RLC) protocol specification," 3rd Generation Partnership Project; Technical Specification Group Radio Access Network; Evolved Universal Terrestrial Radio Access (E-UTRA) (Release 10), 3GPP TS 36.322 V10.0.0, Dec. 2012, LTE Advanced, 39 pages.

Hakola et al. "Device-to-Device (D2D) Communication in Cellular Network—Performance Analysis of Optimum and Practical Communication Mode Selection", Wireless Communications and Networking Conference (WCNC) 2010 IEEE, Apr. 2010.

International Search Report and Written Opinion for International Application No. PCT/US2012/049067, mailed Feb. 27, 2013.

Notification Concerning Transmittal of International Preliminary Report on Patentability mailed Feb. 13, 2014 from International Application No. PCT/US2012/049067.

* cited by examiner

OPPORTUNISTIC DEVICE-TO-DEVICE COMMUNICATION

CROSS REFERENCE TO RELATED APPLICATIONS

The present application claims priority to U.S. Provisional Patent Application No. 61/514,010, filed Aug. 1, 2011, entitled "Advanced Wireless Communication Systems and Techniques," and to U.S. Provisional Patent Application No. 61/589,774, filed Jan. 23, 2012, entitled "Advanced Wireless Communication Systems and Techniques," the entire disclosures of which are hereby incorporated by reference in their entirety.

FIELD

Embodiments of the present invention relate generally to the technical field of data processing, and more particularly, to opportunistic device-to-device communication.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Wireless mobile devices (e.g., user equipment, or "UE" devices) may communicate with each other over a wireless wide area network ("WWAN"), e.g., using licensed wireless spectrums. "Licensed" wireless spectrums may be reserved for WWAN radio access technology ("RAT") such as the 3GPP Long Term Evolution ("LTE") Release 10 (March 2011) (the "LTE Standard"), the IEEE 802.16 standard, IEEE Std. 802.16-2009, published May 29, 2009 ("WiMAX"), as well as any other wireless protocols that are designated as 3G, 4G, 5G, and beyond.

Some mobile devices may be configured to communicate directly with other mobile devices, e.g., via device-to-device ("D2D") communication. D2D communication may be used, e.g., when mobile devices initiate communication with each other while within direct wireless range of each other. D2D communication may be implemented using licensed or unlicensed wireless spectrum. RATs that may use unlicensed wireless spectrums may include 802.11 ("WiFi"), BlueTooth, near field communication ("NFC"), FlashLinq by Qualcomm®, and so forth. In various embodiments, mobile devices may utilize WiFi Direct to discover and establish direct D2D communication links with other mobile devices. If mobile devices move out-of-range from each other during D2D communication, session continuity may be lost.

Devices may initiate communication with each other while remote from each other over a WWAN, e.g., using licensed wireless technologies, but then move into proximity of each other. Continuing to using WWAN resources to communicate while within proximity of each other may drain WWAN resources that may be put to better use for communications between mobile devices that are remote from each other.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Using a licensed spectrum of a wireless wide area network ("WWAN") for communications between mobile devices that are proximate to each other may waste WWAN resources. Direct device-to-device ("D2D") communications may be used between proximate mobile devices, but communication may be lost if the mobile devices move away from each other. Accordingly, in various embodiments, one or more service flows between mobile devices may be selectively transitioned from being direct, e.g., using a first radio access technology ("RAT"), to being indirect, or device-to-device ("D2D"), e.g., using a second RAT. In various embodiments, the first RAT and second RAT may be used to exchange data over licensed and/or unlicensed spectrums. A service flow may be transitioned from indirect to direct for a variety of reasons, like opportunistically offloading traffic. Likewise, a service flow may be transitioned from direct to indirect for a variety of reasons, like ensuring continued connectivity of the service flow after mobile devices travel apart from one another.

Multiple service flows may exist between a mobile device and other mobile devices or a network resource. For example, a first mobile device may exchange video data with a second mobile device using a first service flow (or first set of service flows), and may exchange voice data with a third mobile device using a second data flow (or second set of data flows). In various embodiments, service flows may be selected for transition between direct and indirect based at least in part on the type of data they carry. For example, a service flow carrying a large amount of data (e.g., a file transfer or video stream) may be more likely selected for transition from indirect to direct. On the other hand, service flows carrying less data (e.g., voice) may not be selected for transition from indirect to direct, even where it might be feasible. The benefits gained from such a transition may be outweighed by resources required for its implementation.

In various embodiments, a WWAN node such as a radio network access node may monitor the proximity between mobile devices that are in communication with each other, e.g., indirectly through the WWAN over a licensed WWAN spectrum. For instance, the WWAN node may monitor whether the mobile devices are both within a cell provided by a radio network access node, or whether the mobile devices are within a predetermined distance of each other (as may be determined using, e.g., a global positioning system, or "GPS").

Upon determination that the mobile devices are proximate, and therefore have at least some potential for direct D2D communication, the WWAN node may determine whether a particular criterion is met. For instance, the criterion may be whether the mobile devices are able to discover each other, e.g., using WiFi Direct, or whether a signal strength between the mobile devices after discovery exceeds a particular threshold. The WWAN node may monitor for satisfaction of these criteria, e.g., by monitoring a signal strength between the mobile devices.

Once the criterion has been met, the WWAN node may facilitate a transition of one or more service flows between the two or more mobile devices from being indirect through the WWAN using a first RAT to being direct using a second RAT. In various embodiments, transition of some service flows between indirect and direct communication may not impact other service flows and/or communications to/from the mobile devices.

In various embodiments, the WWAN node may also facilitate a transition of the two or more mobile devices from being in direct communication with each other using the second RAT to being in indirect communication with each other through the WWAN using the first RAT, responsive to a determination that another criterion has been met. In various embodiments, this other criterion may include whether the two or more mobile devices are more than a predetermined distance from each other, or whether a signal strength of the direct wireless communication between the two or more mobile devices is less than a predetermined threshold.

Figure 1:
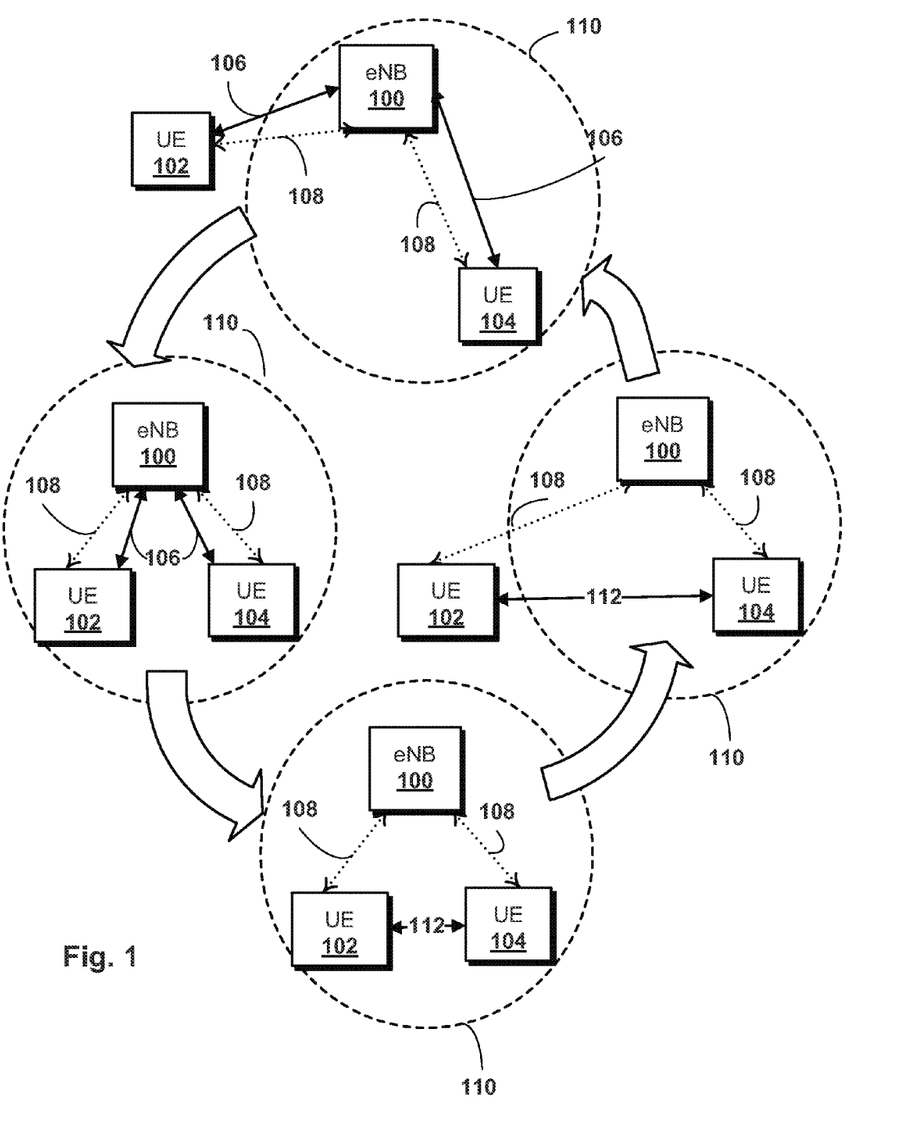
FIG. 1 schematically illustrates example transitions of one or more service flows between a wireless wide area network and device-to-device communication, in accordance with various embodiments.

FIG. 1 depicts an example cycle of transitions of one or more service flows between indirect (WWAN) and direct (D2D) communications that may be facilitated by a WWAN node such as an evolved Node B ("eNB") 100, in accordance with various embodiments. In the top portion of the cycle, eNB 100 may be facilitating WWAN (e.g., Long Term Evolution, or "LTE") communication between two mobile devices: a first user equipment ("UE") device 102 and a second UE device 104. eNB 100 may have established and be using a data plane 106 to send and receive data from each UE device, e.g., for transport to the other UE device. eNB 100 may also have established and may be using a control plane 108 to control communications between first UE device 102 and second UE device 104. For example, control plane 108 may be used to exchange radio resource control ("RRC") signals, whereas data plane 106 may include service flows carrying voice or other data.

At some point, eNB 100 may determine that direct D2D communication between first UE device 102 and second UE device 104 may be possible, and in some cases, preferable. For example, first UE device 102 and second UE device 104 may come within a predetermined proximity of each other. In various embodiments, a predetermined proximity may be based on a range of wireless technology capability of the mobile devices. For instance, on the left side of FIG. 1, first UE device 102 has wandered into a cell 110 provided by eNB 100. Cell 110 also happens to be the cell to which second UE device 104 is connected. eNB 100 may monitor a cell identifier associated with each mobile device in WWAN communication through eNB 100, and may detect when a cell identifier of first UE device 102 becomes, e.g., after a handoff, the same cell identifier as that of second UE device 104.

eNB 100 may be configured to determine that the UE devices are sufficiently proximate in other ways. For example, mobile devices such as first UE device 102 and second UE device 104 may periodically or upon request provide eNB 100 with a geographic location (e.g., via a global positioning system, or "GPS," on the mobile device). eNB 100 may be configured to monitor geographic locations of mobile devices in communication with each other through eNB 100, and to determine whether the coordinates place the mobile devices within a predetermined proximity of each other.

Once eNB 100 determines that the UE devices are proximate, eNB 100 may determine whether a particular criterion (e.g., signal strength between UE devices exceeds a minimum threshold) is met. For instance, eNB 100 may instruct first UE device 102 and second UE device 104 to attempt to discover each other, e.g., using WiFi Direct. In various embodiments, eNB 100 may also provide information usable by the UE devices to communicate directly using D2D. For example, eNB 100 may provide information it receives from the mobile devices, e.g., during WWAN entry procedures, such as MAC addresses of alternative RAT interfaces of each mobile device. In various embodiments, eNB 100 may also provide one or more cryptographic keys to the UE devices.

Assuming the UE devices are able to discover each other and connect directly, eNB 100 may then test the signal strength between them. If the signal strength between first UE device 102 and second UE device 104 exceeds a minimum threshold, eNB 100 may facilitate transition service flows between the UE devices from being indirect through eNB 100 using a first RAT (e.g., over a licensed spectrum) to being direct D2D communication using a second RAT (e.g., over an unlicensed spectrum). In some embodiments, the D2D communication may be referred to as a "secondary carrier" because it may be available for opportunistic offloading of data traffic when two or more mobile devices are, e.g., within proximity of each other and therefore capable of communicating directly over the D2D link.

An example of this is shown on the bottom of FIG. 1. Upon determination that a signal strength between first UE device 102 and second UE device 104 exceeds a minimum threshold, eNB 100 may reduce traffic carried by the data planes 106 between eNB 100 and the respective UE devices, and facilitate establishment of one or more new D2D data tunnels 112 directly between first UE device 102 and second UE device 104. For instance, eNB 100 may issue one or more commands to each UE device to transition one or more service flows between the mobile devices to being direct, rather than through a WWAN to which eNB 100 provides access.

In various embodiments, a D2D data tunnel 112 may be a bidirectional layer 2 link. In various embodiments, D2D data tunnel 112 may carry traffic encoded using frequency division duplexing ("FDD") or time division duplexing ("TDD"). While only two mobile devices are shown communicating using D2D in FIG. 1, this is not meant to be limiting, and more than two mobile devices may establish D2D data tunnels with each other as part of a multi-party communication session.

In various embodiments, a WWAN node such as eNB 100 may maintain various levels of control over D2D communications between mobile devices. For example, at the bottom in FIG. 1, eNB 100 maintains the control planes 108 between first UE device 102 and second UE device 104. In various embodiments, eNB 100 may use these control planes 108 to configure parameters and selective measurements associated with D2D data tunnel 112.

In various embodiments, control planes 108 may be implemented using various technologies. In some embodiments, such as the one shown in FIG. 2 and described below, eNB 100 may implement RRC signaling over control planes 108 to monitor and/or otherwise control D2D tunnel 112 between first UE device 102 and second UE device 104.

Using control plane 108, eNB 100 may continue to monitor first UE device 102 and second UE device 104 after D2D data plane is established. For instance, eNB 100 may continue to monitor first UE device 102 and second UE device 104 to determine whether they meet another criterion. Upon determining that the other criterion is met, eNB 100 may facilitate transition if the UE devices back to indirect communication through eNB 100.

Various criteria may trigger this transition back to indirect communication. For example, in FIG. 1 on the right, first UE device 102 has wandered outside of cell 110. In some cases, first UE device 102 may be outside of a direct wireless range of second UE device 104. eNB 100 may determine that this has occurred, e.g., by detecting that the signal strength has fallen below a minimum threshold, and may facilitate a transition of first UE device 102 and second UE device 104 from being in direct communication with each other over D2D data tunnel 112 to being in indirect communication with each other through eNB 100, as shown at the top in FIG. 1.

Figure 2:
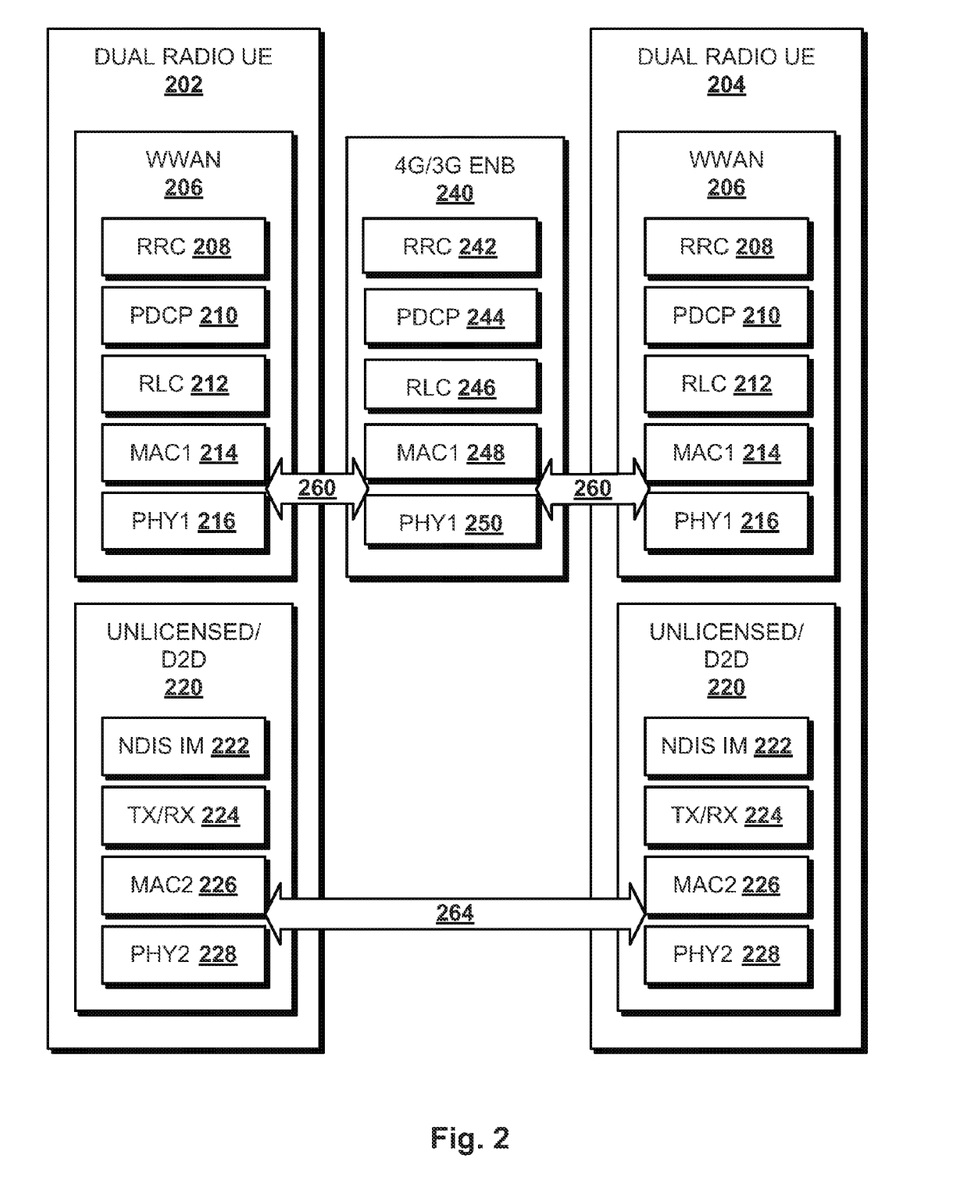
FIG. 2 schematically illustrates example mobile devices, in accordance with various embodiments.

FIG. 2 depicts one example of how a first dual-radio UE device 202 and a second dual-radio UE device 204 may be configured to implement transitions between direct (e.g., D2D) and indirect communications, in accordance with various embodiments. In this example, first UE device 202 and second UE device 204 may include the same components, and so those components are numbered the same. However, this is not meant to be limiting, and mobile devices configured to implement techniques described herein may have a variety of configurations.

In various embodiments, each UE device (202, 204) may include a WWAN module 206. In various embodiments, WWAN module 206 may be configured to implement a licensed wireless technology (e.g., 3G, 4G), and may include a stack having various layers, such as an RRC layer 208, a Packet Data Convergence Protocol ("PDCP") layer 210, a Radio Link Control ("RLC") layer 212, a first Media Access Control ("MAC") interface 214 (e.g., having a first MAC address), and a first physical ("PHY") interface 216.

In various embodiments, each UE device (e.g., 202, 204) may also include another radio communication module 220, which may be configured to implement shorter range and/or unlicensed wireless technologies. In various embodiments, module 220 may be used to implement D2D wireless communications with other mobile devices. In various embodiments, module 220 may include a Network Driver Interface Specification ("NDIS") intermediate ("IM") layer 222, a transmit/receive ("TX/RX") layer 224, a second MAC interface 226 (e.g., having a second MAC address), and a second PHY interface 228.

A radio network access node 240, which in FIG. 2 is an eNB, may include an RRC layer 242, a PDCP layer 244, an RLC layer 246, a MAC interface 248 and a PHY interface 250. Although not shown in FIG. 2, in various embodiments, radio network access node 240 may include multiples of each of these components. In various embodiments, one or more components of radio network access node 240, such as logic associated with RRC layer 242, may be configured to perform multi-RAT coordination to map traffic flows between first UE device 202 and second UE device 204 over multiple RATs.

First UE device 202 and second UE device 204 may be in indirect communication with each other through radio network access node 240. Both a control plane for exchanging, e.g., RRC signals, and a data plane for exchanging one or more service flows carrying other data, may be maintained via a connection 260. In various embodiments, connection 260 may remain always on even where some service flows are transitioned to direct from indirect, as will be discussed below.

When first UE device 202 and second UE device 204 satisfy a particular criterion (e.g., a signal strength between them exceeds a particular threshold), radio network access node 240 (or another WWAN node) may facilitate a transition of one or more service flows between the first and second UE devices from being indirect through radio network access node 240 over connection 260 using a first RAT (e.g., LTE) to being direct using a second RAT (e.g., WiFi). To this end, radio network access node 240 may instruct first UE device 202 and second UE device 204 to establish one or more D2D data tunnels 264 using their respective modules 220.

While the particular criterion remains satisfied (e.g., while the signal strength continues to exceed the minimum threshold) or until a second criterion is met (e.g., the signal grows weak), first UE device 202 and second UE device 204 may exchange some service flows, particularly those carrying large amounts of data such as video, over D2D data tunnel 264. Other service flows carrying smaller data may not require enough bandwidth justify transition to direct through D2D data tunnel 264, and therefore may continue to be exchanged over connection 260.

To conserve power, in various embodiments and/or scenarios, particularly where most or all communication between the UE devices is through a D2D tunnel 264, radio network access node 240 may transition first UE device 202 and/or second UE device 204 into a mode in which RRC signals are reduced, e.g., a discontinuous reception ("DRX") mode.

radio network access node 240 may use a control plane in connection 260 to, among other things, monitor a proximity or signal strength between first UE device 202 and second UE device 204, e.g., to determine whether the signal strength remains sufficiently strong. At that point, radio network access node 240 may facilitate a transition one or more service flows between the first and second UE devices from being direct with each other over data D2D tunnel 264 to being indirect with each other through radio access node 240, e.g., using connection 260.

Figure 3:
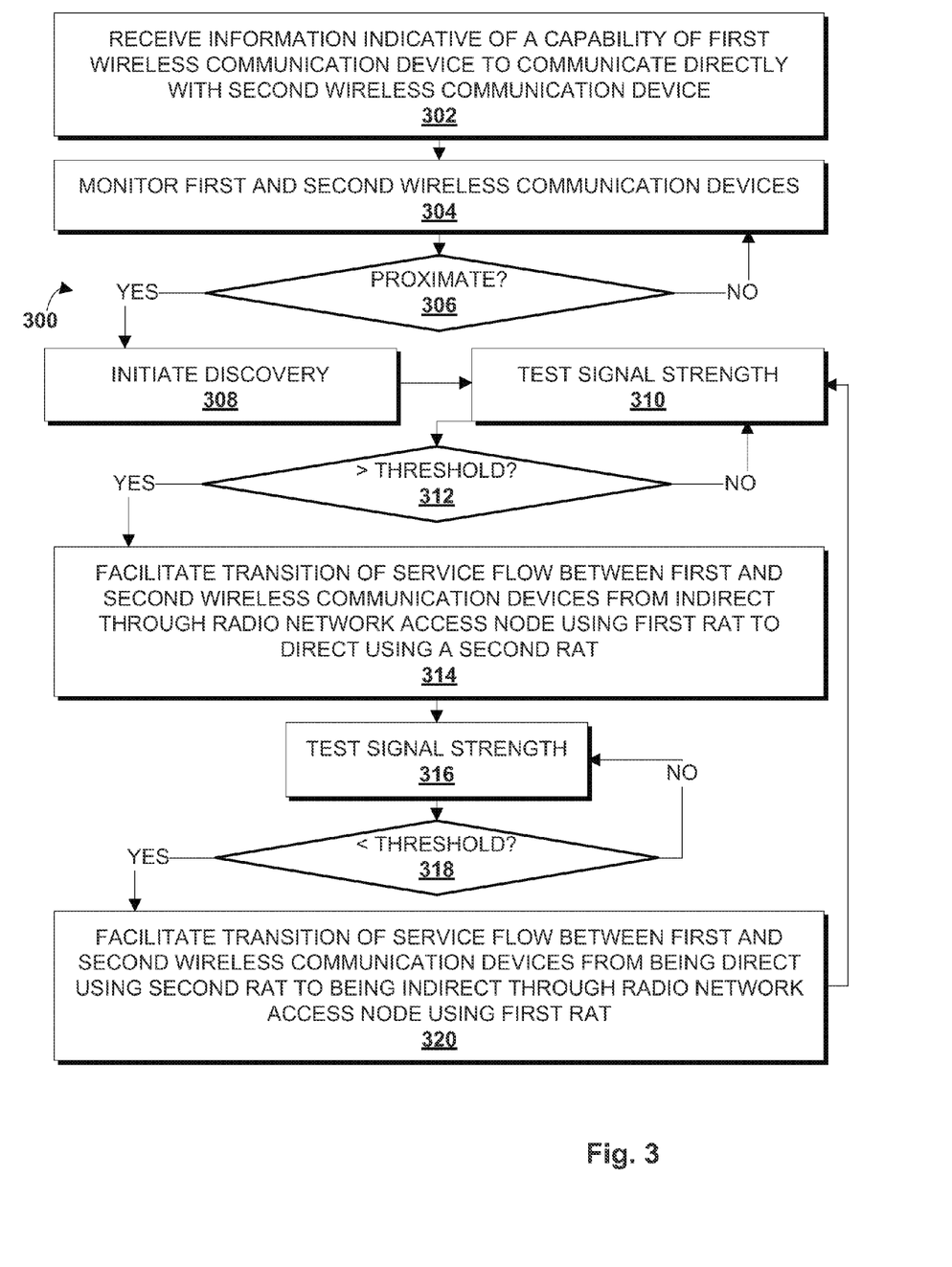
FIG. 3 schematically illustrates an example method that may be implemented by a wireless wide area network node, in accordance with various embodiments.

FIG. 3 depicts an example method 300 that may be implemented on various mobile devices/network nodes, such as eNB 100. These operations may be performed in various orders other than the order shown, and one or more operations may be added or omitted.

At block 302, information may be received, e.g., by a radio network access node (e.g., 100, 240), from a first mobile device (e.g., 102, 202) that is indicative of a capability of the first mobile device to communicate directly with a second mobile device (e.g., 104, 204). This information may include, for instance, information about a RAT capability of the first mobile device, such as a MAC address (or equivalent MAC layer identifier) of a WiFi interface. In various embodiments, similar information may be received, e.g., by the radio network access node, from the second mobile device. In various embodiments, mobile devices (e.g., 102, 104, 202, 204) may be configured to provide such information to a radio network access node during normal WWAN entry procedures. In some embodiments, mobile devices (e.g., 102, 102, 202, 204) may be configured to provide information indicative of multiple alternative RATs that they can use for D2D communication. For example, a mobile device may have, in addition to a cellular interface, both WiFi and Bluetooth radios. The radio network access node may use this information to determine whether the first and second mobile devices are capable of communication directly with each other, e.g., D2D, and to facilitate transitions to and from D2D communication.

At block 304, the first and second mobile devices may be monitored, e.g., by the radio network access node (e.g., 100, 240). In various embodiments, this may include monitoring a proximity of the first and second mobile devices, e.g., based on GPS coordinates or whether the mobile devices are part of the same cell or femto cell.

At block 306, if the mobile devices are determined to not be within a particular proximity of each other, then the radio network access node may continue to monitor the first and second mobile devices at block 304. So long as the mobile devices remain at least a predetermined distance from one another, the radio network access node may continuously monitor their proximity.

However, if at block 306, the mobile devices are determined to be proximate to each other, then at block 308, the radio network access node may instruct the mobile devices, e.g., over control planes (e.g., 108) using RRC signaling, to initiate discovery procedures (e.g., WiFi Direct) so that the mobile devices may discover each other and initiate D2D communication. In various embodiments, the radio network access node may provide radio parameters, MAC addresses and/or other pertinent information it received at block 302, to assist the mobile devices in discovering and/or initiating communication with one another.

At block 310, a signal strength between the mobile devices may be tested. If at block 312 the signal strength fails to exceed a particular threshold (e.g., is too weak or non-existent due to interference), the method 300 may return to block 310. In various embodiments, the signal strength may be tested repeatedly, e.g., at predetermined time intervals, until it exceeds the threshold. In various embodiments, if the mobile devices have multiple RAT interfaces that may be used for D2D communication, signal strengths between these multiple RAT interfaces may be tested.

Once the signal strength exceeds the threshold, at block 314, a transition of one or more service flows between the first and second mobile devices may be facilitated, e.g., by the radio network access node, from being indirect through the radio network access node using a first RAT (e.g., WWAN, licensed spectrum) to being direct using a second RAT (e.g., WiFi, Bluetooth, unlicensed spectrum). For instance, in various embodiments, the radio network access node may instruct, e.g., through a control plane such as 108, the first and second mobile devices to transition one or more service flows (e.g., flows carrying large amounts of data) to be direct, using the second RAT.

In some embodiments, where both mobile devices have multiple alternative RAT interfaces, the radio network access node may facilitate selective flow mapping over combinations and/or aggregations of multiple RAT carriers, e.g., using RRC signaling, to take advantage of as much bandwidth as possible. For example, the radio network access node may facilitate establishment of multiple D2D data tunnels between mobile devices, one over WiFi and another over BlueTooth, and the mobile devices may exchange data over both RAT carriers.

After the transition of the service flows from direct to indirect, at block 316, a signal strength between the first and second mobile devices may be tested again, e.g., by the radio network access node. At block 318, if the signal strength remains above a threshold (e.g., the same threshold as block 312 or a different threshold), then the radio network access node may proceed back to block 316. This may be repeated, e.g., periodically at various time intervals, until the signal strength falls below the threshold. A signal strength dropping below the threshold may be indicative that the mobile devices are no longer in proximity, or that D2D communication is no longer preferable to indirect communication.

At that point, method 300 may proceed to block 320, and a transition of the one or more service flows between first and second mobile devices may be facilitated, e.g., by the radio network access node, from being direct using the second RAT (e.g., WiFi, Bluetooth) to being indirect through the radio network access node using the first RAT (e.g., WWAN, licensed cellular). For instance, in various embodiments, the radio network access node may instruct, e.g., through a control plane such as 108, the first and second mobile devices to transition one or more service flows (e.g., flows carrying large amounts of data) to be indirect, using the first RAT.

Various examples described herein refer to LTE-specific components, but this is not meant to be limiting. Disclosed techniques may be used in other types of licensed and unlicensed WWAN technologies, such as IEEE 802.16 ("WiMAX"). Additionally, in various embodiments, including many of the examples described herein, WiFi/WiFi Direct may be just one example wireless technology that may be used to implement the more general notion of a layer 2 data D2D tunnel directly between mobile devices. Other examples of licensed and unlicensed wireless technologies that may used include BlueTooth, FlashLinq, Time-Division LTE ("TD-LTE"), or any other wireless technology optimized for D2D communication.

In many of the embodiments described herein, radio network access nodes (e.g., 100, 240) are configured to facilitate transition of service flows between being direct (D2D) and being indirect. However, this is not meant to be limiting. In various embodiments, other WWAN nodes may facilitate these transitions, e.g., based on information received from radio network access nodes.

In various embodiments, it may be necessary to intercept D2D communications. For instance, law enforcement agencies may need to conduct electronic surveillance to "listen in" on communications between parties. In various embodiments, and assuming D2D communication between the parties' mobile devices was established based on the mobile devices being covered by the same WWAN node, a WWAN node such as a radio network access node may be configured to force the parties' mobile devices to use indirect, e.g., eNB or access point anchored, communications, even though direct D2D communication may be feasible or more efficient. In various embodiments, this anchored local communication may use WiFi or WWAN radios.

Figure 4:
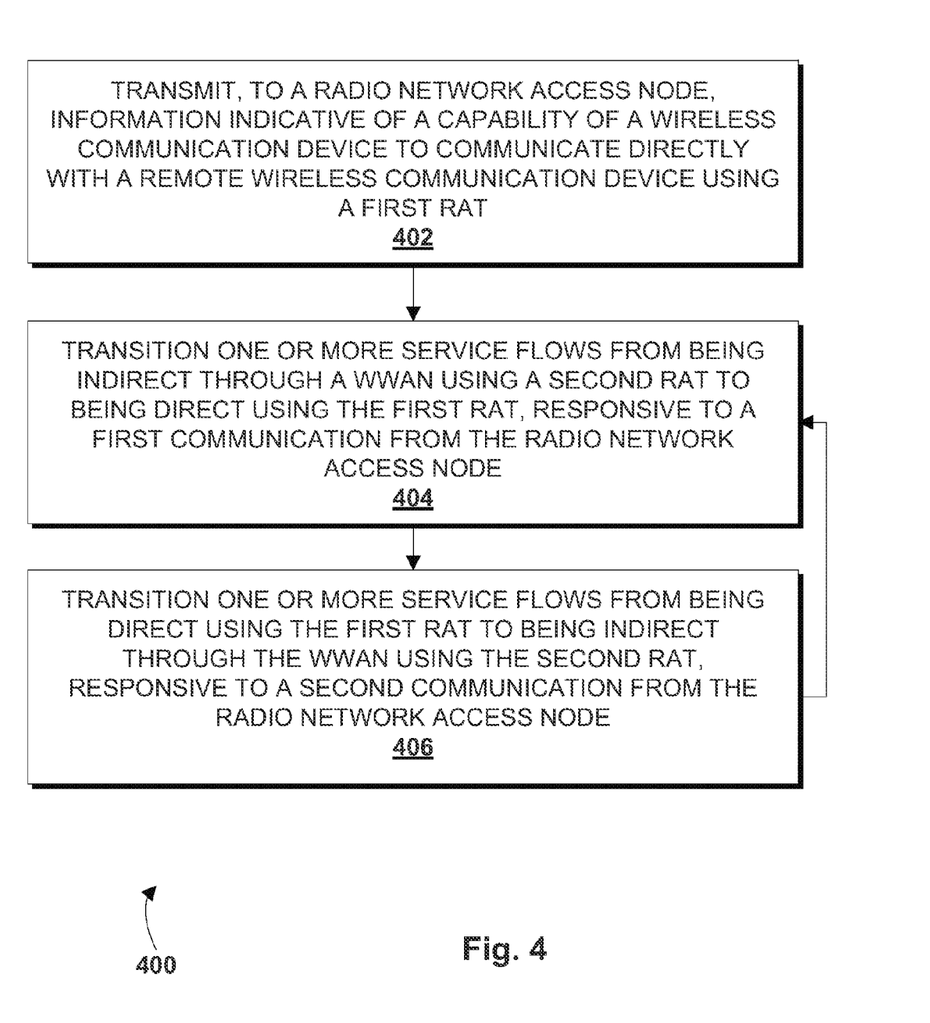
FIG. 4 schematically depicts an example method that may be implemented by a wireless communication device, in accordance with various embodiments.

FIG. 4 depicts an example method 400 that may be implemented by various mobile devices such as UE devices, 102, 104, 202 and 204. In various embodiments, the operations shown in FIG. 4 may coincide with operations in FIG. 3 that may be performed by a WWAN node.

At block 402, the mobile device may transmit, to a radio network access node, information indicative of a capability of the mobile device to communicate directly with a remote mobile device using a first RAT, e.g., WiFi or Bluetooth. At block 404, the mobile device may transition one or more service flows of a plurality of service flows from being indirect through a radio network access node using a second RAT, e.g., LTE, to being direct using the first RAT, responsive to a first communication from the radio network access node. For example, the first communication may include an instruction, e.g., via RRC signaling, for the mobile device to transition one or more service flows from WWAN to D2D.

At block 406, the mobile device may transition one or more service flows from being direct using the first RAT to being indirect through the radio network access node using the second RAT, responsive to a second communication from the radio network access node. For example, the second communication may include an instruction, e.g., via RRC signaling, for the mobile device to transition one or more service flows from D2D to WWAN communication with the remote mobile device.

Figure 5:
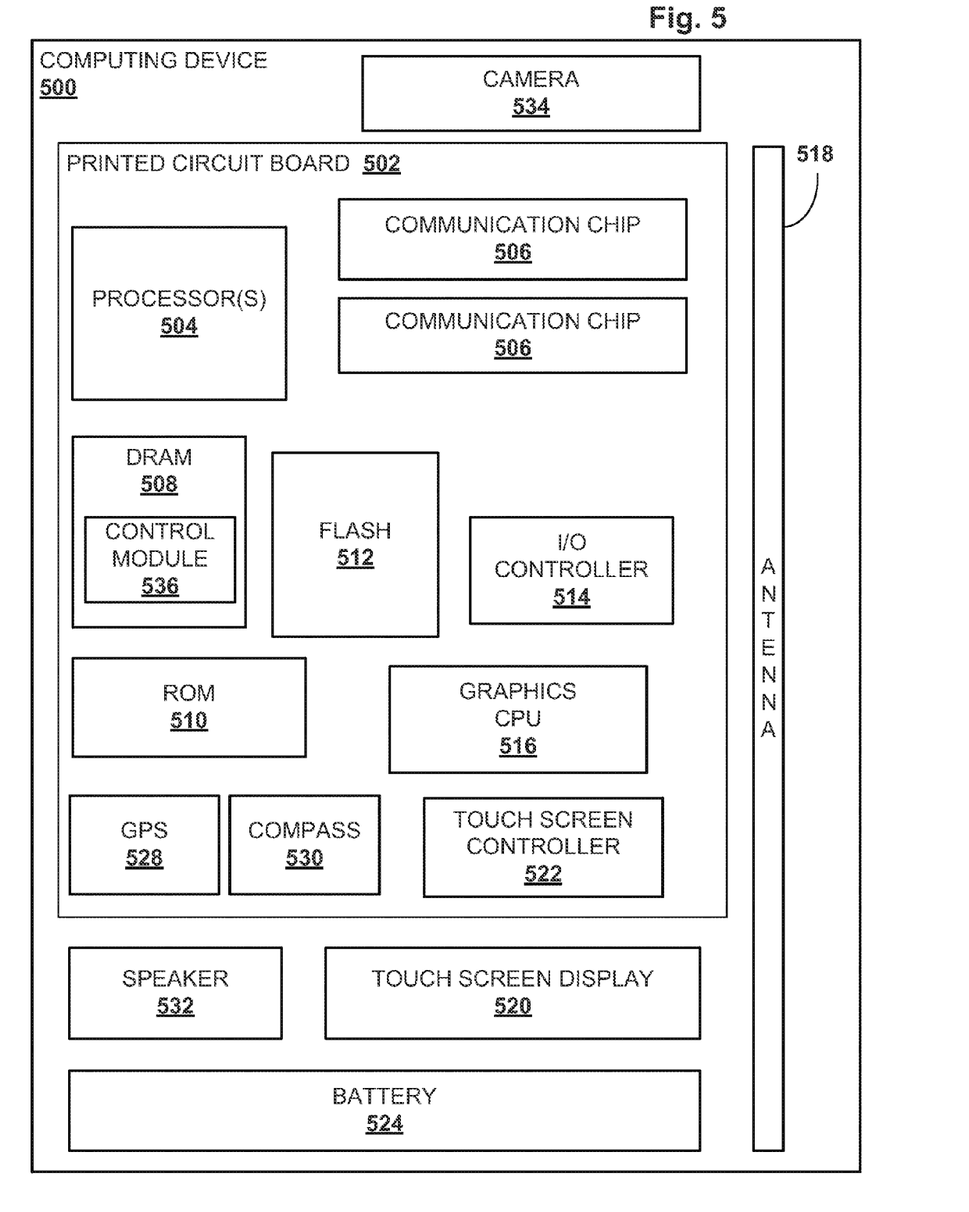
FIG. 5 schematically depicts an example computing device on which disclosed methods and computer-readable media may be implemented, in accordance with various embodiments.

FIG. 5 illustrates an example computing device 500, in accordance with various embodiments. Computing device 500 may include a number of components, one or more processor(s) 504 and at least one communication chip 506. In various embodiments, the processor 504 may be a processor core. In various embodiments, the at least one communication chip 506 may also be physically and electrically coupled to the processor 504. In further implementations, the communication chip 506 may be part of the processor 504. In various embodiments, computing device 500 may include PCB 502. For these embodiments, processor 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, volatile memory (e.g., dynamic random access memory 508, also referred to as "DRAM"), non-volatile memory (e.g., read only memory 510, also referred to as "ROM"), flash memory 512, an input/output controller 514, a digital signal processor (not shown), a crypto processor (not shown), a graphics processor 516, one or more antenna 518, a display (not shown), a touch screen display 520, a touch screen controller 522, a battery 524, an audio codec (not shown), a video codec (not shown), a global positioning system ("GPS") device 528, a compass 530, an accelerometer (not shown), a gyroscope (not shown), a speaker 532, a camera 534, and a mass storage device (such as hard disk drive, a solid state drive, compact disk ("CD"), digital versatile disk ("DVD")) (not shown), and so forth. In various embodiments, the processor 504 may be integrated on the same die with other components to form a System on Chip ("SoC").

In various embodiments, volatile memory (e.g., DRAM 508), non-volatile memory (e.g., ROM 510), flash memory 512, and the mass storage device may include programming instructions configured to enable computing device 500, in response to execution by processor(s) 504, to practice all or selected aspects of methods 300 or 400. For example, one or more of the memory components such as volatile memory (e.g., DRAM 508), non-volatile memory (e.g., ROM 510), flash memory 512, and the mass storage device may include temporal and/or persistent copies of instructions that, when executed, enable computing device 500 to operate a control module 536 configured to practice all or selected aspects of methods 300 or 400.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Most of the embodiments described herein include WiFi and LTE RAT as examples. However, the communication chip 506 may implement any of a number of wireless standards or protocols, including but not limited to IEEE 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 500 may be any other electronic device that processes data.

Embodiments of apparatus, packages, computer-implemented methods, systems, devices, and computer-readable media (transitory and non-transitory) are described herein for opportunistically transitioning, by various network nodes such as a radio network access node, service flows of mobile devices between being direct (e.g., D2D) and indirect (e.g., through a WWAN). In various embodiments, a proximity between first and second mobile devices that are in wireless communication with each other may be monitored. In various embodiments, a selective transition of a service flow between the first and second mobile devices from being indirect through the radio network access node using a first RAT to being direct using a second RAT may be facilitated, e.g., responsive to a determination that a first criterion has been met. In various embodiments, a selective transition of the service flow from being direct using the second RAT to being indirect using the first RAT may be facilitated, e.g., responsive to a determination that a second criterion has been met.

In various embodiments, the first criterion may be whether a wireless signal strength between the first and second mobile devices is greater than a predetermined threshold. In various embodiments, the second criterion may be whether a signal strength between the first and second mobile devices is less than a predetermined threshold.

In various embodiments, information indicative of a capability of the first mobile device to communicate directly with the second mobile device using the second RAT may be received, e.g., by a radio network access node.

In various embodiments, the first RAT may operate in a licensed spectrum and the second RAT may operate in an unlicensed spectrum. In various embodiments, the first RAT may be a cellular wireless technology and the second RAT is an IEEE 802.11 technology or BlueTooth.

In various embodiments, the first and second mobile devices may be instructed, e.g., by the radio network access node, to initiate a discovery procedure to wirelessly communicate directly with each other, responsive to a determination that the first and second mobile devices are within a predetermined proximity of each other. In various embodiments, the monitoring may include determining whether the first and second mobile devices are within the predetermined proximity of each other based on GPS coordinates of the first and second mobile devices. In various embodiments, the monitoring may include determining whether the first and second mobile devices are within the predetermined proximity of each other based on whether the first and second mobile devices are both in direct wireless communication with the radio network access node.

In various embodiments, the direct service flow between the first and second mobile devices using the second RAT may be governed, e.g., by the radio network access node, via a control plane. In various embodiments, the first and second mobile devices may be instructed, e.g., by the radio network access node through a control plane, to communicate with each other directly using the second RAT, responsive to the determination that the first criterion has been met. In various embodiments, the first and second mobile devices may be instructed, e.g., by the radio network access node via a control plane, to communicate indirectly using the first RAT, responsive to the determination that the second criterion has been met. In various embodiments, the radio network access node may be an evolved Node B.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A computer-implemented method, comprising:
   monitoring, by a network node, a proximity between first and second mobile devices that are in wireless communication with each other;
   facilitating, by the network node, a selective transition of a service flow between the first and second mobile devices from being indirect through a radio network access node using a first radio access technology ("RAT") to being direct using a second RAT, responsive to a determination that a first criterion has been met;
   facilitating, by the network node, a selective transition of the service flow from being direct using the second RAT to being indirect using the first RAT, responsive to a determination that a second criterion has been met; and
   receiving, by the network node, from the first mobile device, information indicative of a capability of the first mobile device to communicate directly with the second mobile device using the second RAT.

2. The computer-implemented method of claim 1, wherein the first RAT operates in a licensed spectrum and the second RAT operates in an unlicensed spectrum.

3. The computer-implemented method of claim 2, wherein the first RAT is a cellular wireless technology and the second RAT is an IEEE 802.11 technology or BlueTooth.

4. The computer-implemented method of claim 1 wherein the first criterion is whether a wireless signal strength between the first and second mobile devices is greater than a predetermined threshold.

5. The computer-implemented method of claim 1 wherein the second criterion is whether a signal strength between the first and second mobile devices is less than a predetermined threshold.

6. The computer-implemented method of claim 1, further comprising governing, by the radio network access node, through a control plane, the direct service flow between the first and second mobile devices using the second RAT.

7. The computer-implemented method of claim 6, further comprising instructing, by the radio network access node, through the control plane, the first and second mobile devices to communicate with each other directly using the second RAT, responsive to the determination that the first criterion has been met.

8. The computer-implemented method of claim 6, further comprising instructing, by the radio network access node, through the control plane, the first and second mobile devices to communicate indirectly using the first RAT, responsive to the determination that the second criterion has been met.

9. The computer-implemented method of claim 1, wherein the radio network access node is an evolved Node B.

10. A computer-implemented method comprising:
    monitoring, by a network node, a proximity between first and second mobile devices that are in wireless communication with each other;
    facilitating, by the network node, a selective transition of a service flow between the first and second mobile devices from being indirect through a radio network access node using a first radio access technology ("RAT") to being direct using a second RAT, responsive to a determination that a first criterion has been met;
    facilitating, by the network node, a selective transition of the service flow from being direct using the second RAT to being indirect using the first RAT, responsive to a determination that a second criterion has been met; and instructing, by the network node, the first and second mobile devices to initiate a discovery procedure to wirelessly communicate directly with each other, responsive to a determination that the first and second mobile devices are within a predetermined proximity of each other.

11. The computer-implemented method of claim 10, wherein the monitoring includes determining whether the first and second mobile devices are within the predetermined proximity of each other based on global positioning system ("GPS") coordinates of the first and second mobile devices.

12. The computer-implemented method of claim 10, wherein the monitoring includes determining whether the first and second mobile devices are within the predetermined proximity of each other based on whether the first and second mobile devices are both in direct wireless communication with the radio network access node.

13. A system, comprising:
a processor;
a memory operably coupled to the processor; and
a control module configured to be operated by the processor to:
selectively transition a service flow with a remote mobile device from being indirect through a radio network access node using a first RAT, to being direct with the remote mobile device using a second RAT, responsive to a first communication from the radio network access node;
selectively transition the service flow from being direct using the second RAT to being indirect through the radio network access node using the first RAT, responsive to a second communication from the radio network access node; and
transmit, to the radio network access node, information indicative of a capability of the system to communicate directly with the remote mobile device using the second RAT.

14. The system of claim 13, wherein the first RAT uses a licensed wireless spectrum and the second RAT uses an unlicensed wireless spectrum.

15. The system of claim 14, wherein the first RAT is a cellular wireless technology and the second RAT is an IEEE 802.11 technology or BlueTooth.

16. The system of claim 13, wherein the control module is further configured to monitor a control plane with the radio network access node, wherein the control plane governs the direct service flow with the remote mobile device using the second RAT.

17. The system of claim 16, wherein the control module is further configured to receive, from the radio network access node, through the control plane, an instruction to communicate with the remote mobile device directly using the second RAT.

18. The system of claim 16, wherein the control module is further configured to receive, from the radio network access node, through the control plane, an instruction to communicate with the remote mobile device indirectly using the first RAT.

19. The system of claim 18, wherein the instruction is received using radio resource control signaling.

20. The system of claim 13, wherein the system is a user equipment device configured to communicate using first RAT and second RAT, and the radio network access node is an evolved Node B.

21. The system of claim 13, further comprising a touch screen display.

22. A wireless wide area network node, comprising:
a processor;
a memory operably coupled to the processor; and
a control module configured to be operated by the processor to:
monitor first and second mobile devices that are in wireless communication with each other;
facilitate a selective transition of one or more of a plurality of service flows between the first and second mobile devices from being indirect through the wireless wide area network over a licensed wireless spectrum to being direct over an unlicensed wireless spectrum, responsive to a determination that a first criterion is met;
facilitate a selective transition of the one or more of the plurality of service flows from being direct over the unlicensed wireless spectrum to being indirect through the wireless wide area network over the licensed wireless spectrum, responsive to a determination that a second criterion has been met; and
receive, from the first communication mobile device, information indicative of a capability of the first mobile device to communicate directly with the second mobile device over the unlicensed wireless spectrum.

23. The wireless wide area network node of claim 22, wherein the first criterion is whether a signal strength between the first and second mobile devices is greater than a predetermined threshold, and the second criterion is whether the signal strength is less than the predetermined threshold.

* * * * *